United States Patent
Zhang

(10) Patent No.: US 8,665,394 B2
(45) Date of Patent: Mar. 4, 2014

(54) LIQUID CRYSTAL DISPLAY AND METHOD FOR FIXING CIRCUIT BOARD THEREOF

(75) Inventor: Tian Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 329 days.

(21) Appl. No.: 13/000,213

(22) PCT Filed: Dec. 7, 2010

(86) PCT No.: PCT/CN2010/079495
§ 371 (c)(1),
(2), (4) Date: Dec. 20, 2010

(87) PCT Pub. No.: WO2012/027933
PCT Pub. Date: Mar. 8, 2012

(65) Prior Publication Data
US 2012/0057093 A1    Mar. 8, 2012

(30) Foreign Application Priority Data
Sep. 3, 2010    (CN) .......................... 2010 1 0278805

(51) Int. Cl.
*G02F 1/1333*    (2006.01)
(52) U.S. Cl.
USPC ............................................. 349/60; 349/58
(58) Field of Classification Search
USPC ...................................... 349/58–60, 149–150
See application file for complete search history.

(56) References Cited

U.S. PATENT DOCUMENTS

| 7,064,952 | B1 | 6/2006 | Chen et al. | |
|---|---|---|---|---|
| 2005/0117285 | A1* | 6/2005 | Bang et al. | 361/681 |
| 2007/0236875 | A1* | 10/2007 | Azuma et al. | 361/681 |
| 2007/0273807 | A1* | 11/2007 | Yun | 349/58 |
| 2008/0259239 | A1* | 10/2008 | Fang | 349/60 |

FOREIGN PATENT DOCUMENTS

| CN | 2750626 Y | 3/2008 |
|---|---|---|
| CN | 101149495 A | 3/2008 |
| CN | 101477262 A | 7/2009 |
| CN | 101509647 A | 8/2009 |
| JP | 2001075077 A | 3/2001 |

* cited by examiner

*Primary Examiner* — Jessica M Merlin
(74) *Attorney, Agent, or Firm* — Sughrue Mion, PLLC

(57) ABSTRACT

A liquid crystal display and a method for fixing a circuit board thereof are provided in the present invention. The liquid crystal display includes: a back plate having a back plate body, at least one elastic piece disposed at the back plate body, the elastic piece including at least one supporting portion; a circuit board having a grounding area, the circuit board located on the outside of the back plate body, and the grounding area contacting with the supporting portion of the elastic piece; a liquid crystal display panel electrically connected with the circuit board; and a plastic housing having a plurality of sidewalls and a top wall, the circuit board located on the inside of the sidewall, the sidewall having at least one hook, and the hook engaged with the elastic piece for elastically clipping and fixing the circuit board. The present invention has advantages of few parts, simple structure and convenient for assembly.

19 Claims, 5 Drawing Sheets tion, the present invention adopts the following technical solution:

LIQUID CRYSTAL DISPLAY AND METHOD FOR FIXING CIRCUIT BOARD THEREOF

BACKGROUND OF THE INVENTION

1. Field of the Invention

The present invention relates to a technology field of a liquid crystal display, and more particularly to a liquid crystal display and a method for fixing a circuit board thereof.

2. Description of the Prior Art

In the prior art, a liquid crystal display (LCD) has been widely used. The LCD generally comprises a backlight module, a LCD panel and so on. Because a printed circuit board (PCB) is connected to the LCD panel in the LCD, and the connecting part is a package structure of flexible tape automated bonding (TAB), the fixture of the PCB is a very important chain in the LCD design.

At present, the modes for fixing the PCB include:

1. Employing screws for fixing: By disposing holes in a plastic housing, the screws are employed to fix the circuit board to a back plate and to simultaneously achieve a grounding purpose. This fixing mode inevitably needs a certain number of the screws, and the circuit board is commonly placed on a side of the back plate, so it is inconvenient for fixing the screws and results in the efficient of the screw-locking process being lower. Therefore, this fixing mode has disadvantages of high cost and long assembly working hours.

2. Increasing more clip components for fixing: By increasing the clip components and electrical foams, then the electrical foams are employed to contact with a front frame or a back housing for grounding. Obviously, this fixing mode additionally increases many clip components, the electrical foams and so on. And, the electrical foams need to increase a process for being assembled. So this fixing mode has disadvantages of many parts, high cost and long assembly working hours.

3. Only employing foams: The circuit board is directly placed at an expected location, and the electrical foams are employed to contact with the front frame or the back housing for grounding. At the same time, the foams are employed to fix the circuit board, and to cushion an outside force of impact on the circuit board and peripheral parts. This fixing mode needs thicker and more foams.

As described above, the present modes for fixing the circuit board have disadvantages of many parts, high cost, a complex assembly and so on.

BRIEF SUMMARY OF THE INVENTION

An object of the present invention is to solve the aforementioned problem existed in the prior art, and to provide a liquid crystal display having few parts and simple structure and being convenient for assembling.

To achieve the aforementioned object of the present invention, the present invention adopts the following technical solution:

A liquid crystal display, the liquid crystal display comprises:

a back plate having a back plate body, at least one elastic piece disposed at the back plate body, the elastic piece including at least one supporting portion;

a circuit board having a grounding area, the circuit board located on the outside of the back plate body, and the grounding area contacting with the supporting portion of the elastic piece;

a liquid crystal display panel electrically connected with the circuit board; and a plastic housing having a plurality of sidewalls and a top wall, the circuit board located on the inside of the sidewall, the sidewall having at least one hook, and the hook engaged with the elastic piece for elastically clipping and fixing the circuit board.

In one embodiment of the present invention, the elastic piece is an arched shape, an arched top of the arched shape is the supporting portion, two end edges of the arched shape have bending edges, the back plate body disposes mounting holes, and the elastic piece employs the engagement of the bending edge and the mounting hole to be fixed on the back plate body.

In one embodiment of the present invention, the number of the bending edges is four, being symmetrically formed on four corners of a bottom of the elastic piece.

In one embodiment of the present invention, the elastic piece is locked and fixed on the back plate body through screws.

In one embodiment of the present invention, the elastic piece is fixed on the back plate body through adhesive tapes.

In one embodiment of the present invention, the circuit board forms a slot at a location corresponding to the hook, and the hook is engaged with the slot.

In one embodiment of the present invention, an edge of a first end of the elastic piece has a first bending edge, the back plate body disposes a mounting hole, the elastic piece employs the first bending edge to be engaged with the mounting hole for being fixed on the back plate body, the elastic piece has a second bending edge on an edge of a second end opposite to the first end, and the second bending edge is used as the supporting portion.

In one embodiment of the present invention, the first bending edge is U-shaped.

In one embodiment of the present invention, the first bending edge is close toward the elastic piece after being bent, and the first bending edge also includes an inner extending portion.

Another object of the present invention is to provide a method for fixing a circuit board of a liquid crystal display, having advantages of fast assembly, low cost, good grounding and vibration resistance.

To achieve the aforementioned object of the present invention, the present invention adopts the following technical solution:

A method for fixing a circuit board of a liquid crystal display, the method for fixing the circuit board comprises the following steps of:

providing a back plate, the back plate having a back plate body, at least one elastic piece disposed at the back plate body, the elastic piece including at least one supporting portion;

providing a circuit board having a grounding area, the circuit board located on the outside of the back plate body, and the grounding area contacting with the supporting portion of the elastic piece;

providing a liquid crystal display panel electrically connected with the circuit board; and providing a plastic housing having a plurality of sidewalls and a top wall, the circuit board located on the inside of the sidewall, and the liquid crystal panel located under the top wall, the sidewall having at least one hook, and the hook engaged with the elastic piece for elastically clipping and fixing the circuit board.

In one embodiment of the present invention, the elastic piece is an arched shape, an arched top of the arched shape is the supporting portion, two end edges of the arched shape have bending edges, the back plate body disposes mounting holes, and the elastic piece employs the engagement of the bending edge and the mounting hole to be fixed on the back plate body.

In one embodiment of the present invention, the number of the bending edges is four, being symmetrically formed on four corners of a bottom of the elastic piece.

In one embodiment of the present invention, the elastic piece is locked and fixed on the back plate body through screws.

In one embodiment of the present invention, the elastic piece is fixed on the back plate body through adhesive tapes.

In one embodiment of the present invention, the circuit board forms a slot at a location corresponding to the hook, and the hook is engaged with the slot.

In one embodiment of the present invention, an edge of a first end of the elastic piece has a first bending edge, the back plate body disposes a mounting hole, the elastic piece employs the first bending edge to be engaged with the mounting hole for being fixed on the back plate body, the elastic piece has a second bending edge on an edge of a second end opposite to the first end, and the second bending edge is used as the supporting portion.

In one embodiment of the present invention, the first bending edge is U-shaped.

In one embodiment of the present invention, the first bending edge is close toward the elastic piece after being bent, and the first bending edge also includes an inner extending portion.

The beneficial effects of the present invention are that: the present invention is a simple structure, without additional parts, and achieving the objects of fixing the circuit board, fast assembling the LCD and saving cost.

DETAILED DESCRIPTION OF THE PREFERRED EMBODIMENTS

Figure 1:
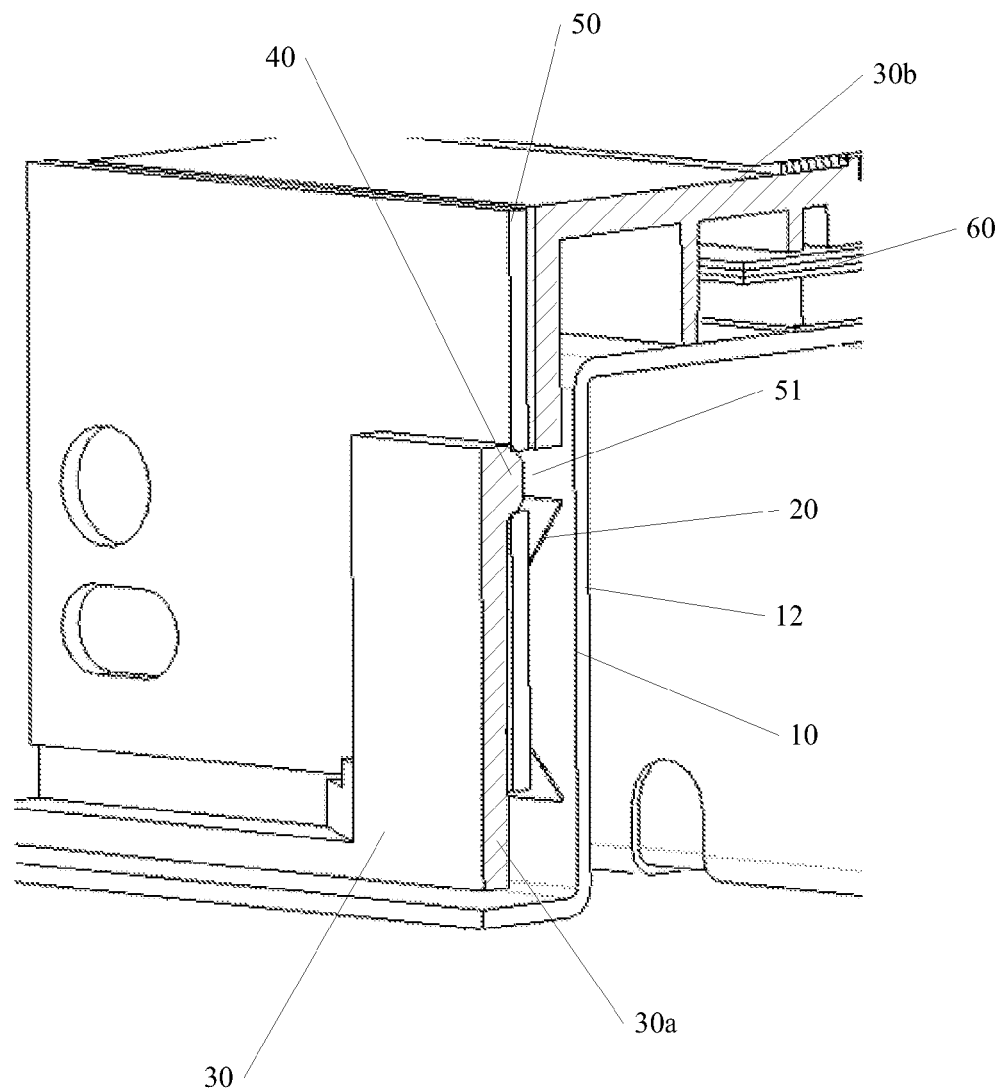
FIG. 1 is a structure schematic view of an LCD of the present invention.
Figure 2:
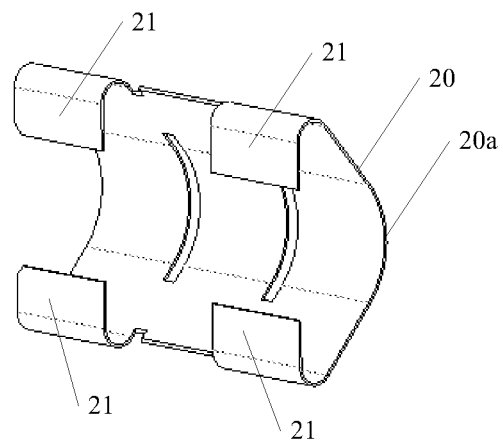
FIG. 2 is a structure schematic view of one embodiment of an elastic piece of the present invention.

For more clearly and easily understanding the aforementioned object, the feature and the advantage of the present invention, the following text will take preferred embodiments of the present invention with reference to the accompanying drawings for detail description as follows:

As shown in FIGS. 1 and 2, an LCD comprises a back plate 10 having a back plate body 12, at least one elastic piece 20 is disposed at the back plate body 12, the elastic piece 20 being an arched shape, and a top portion of which being a supporting portion 20a; a circuit board 50 having a grounding area (such as a circuit on an inner surface of the circuit board 50), the circuit board 50 located on the outside of the back plate body 12, and the grounding area contacting with the supporting portion 20a of the elastic piece 20; an LCD panel 60 connected to the circuit board 50; and a plastic housing 30 having a plurality of sidewalls 30a and a top wall 30b, the circuit board 50 located on the inside of the sidewall 30a, the LCD panel 60 located under the top wall 30b, the sidewall 30a having at least one hook 40, the plastic housing 30 and the hook 40 being against the surface of the circuit board 50, the surface where the circuit board 50 contacting with the hook 40 being opposite to the surface where the grounding area located, thereby the hook 40 being combined with the elastic piece 20, for elastically clipping and fixing the circuit board 50.

Figure 3:
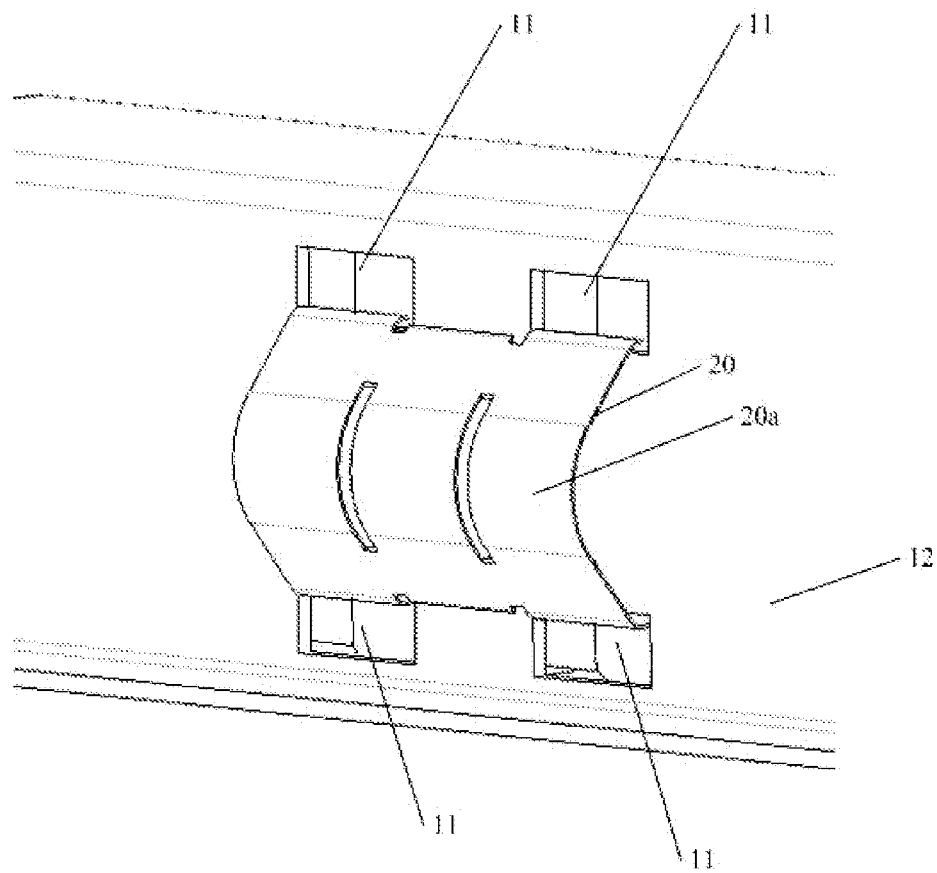
FIG. 3 is a schematic view of the elastic piece of FIG. 2 being disposed on a back plate.
Figure 5:
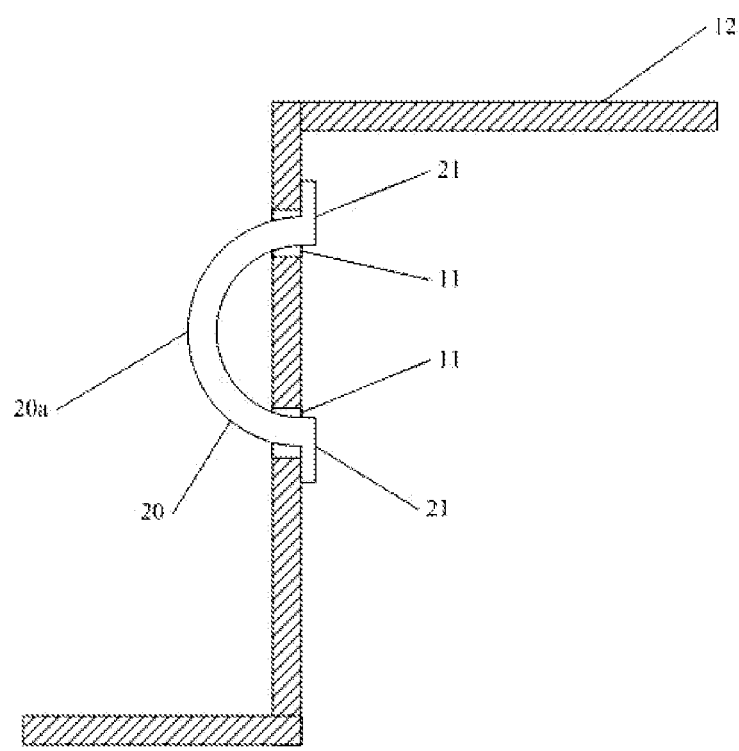
FIG. 5 is a structure schematic view of a second embodiment of an elastic piece of the present invention.

Referring to FIGS. 2 and 3, in one embodiment of the present invention, two end edges of the elastic piece 20 have bending edges 21 toward inside. The back plate body 12 disposes mounting holes 11. The elastic piece 20 employs the engagement of the bending edges 21 and the mounting holes 11 to be fixed on the back plate body 12. In this embodiment, the number of the bending edges 21 is four, being symmetrically formed on four corners of a bottom of the elastic piece 20, thereby the elastic piece 20 being stably combined with the back plate body 12. As shown in FIG. 5, the bending edges 21 at the edges of the two ends of the elastic piece 20 also can be disposed toward outside.

In other embodiments of the present invention, the elastic piece 20 may also be without the bending edges 21, and the elastic piece 20 is locked and fixed on the back plate body 12 through screws, or is bonded to the back plate body 12 through adhesive tapes.

Referring to FIG. 1, the circuit board 50 forms a slot 51 in an edge thereof at a location corresponding to the hook 40. The slot 51 makes the fixing effect of the hook 40 better, for preventing the circuit board 50 from sliding and being unexpectedly detached from the sidewall 30a of the plastic housing 30.

Figure 6:
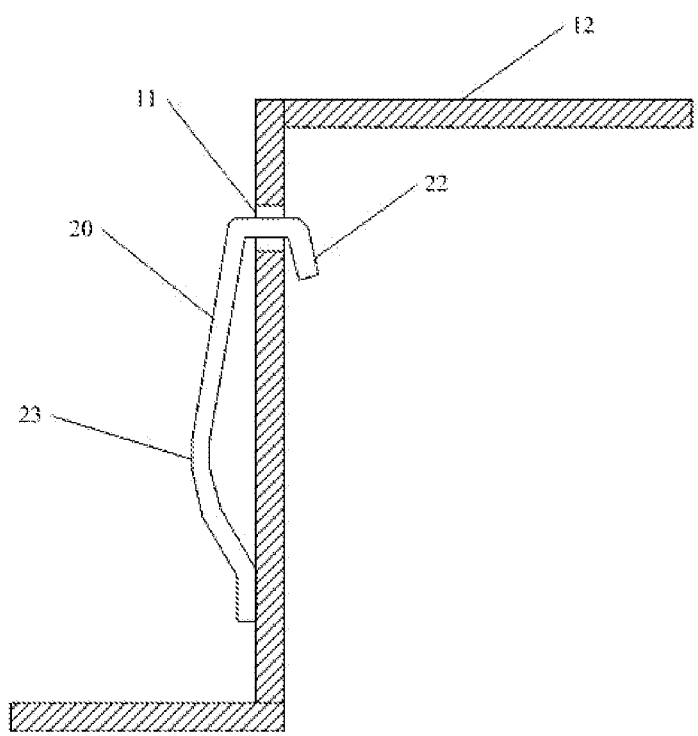
FIG. 6 is a structure schematic view of a third embodiment of an elastic piece of the present invention.

As shown in FIG. 6, the structure of the elastic piece 20 also may be that: an edge of one end has a first bending edge 22, the elastic piece 20 employs the engagement of the first bending edge 22 and the mounting hole 11 of the back plate body 12 to be fixed on the back plate body 12, an edge of a second end being opposite to the first end has a second bending edge 23, and the second bending edge 23 is used as the supporting portion for contacting with the grounding area of the circuit board 50.

Figure 7:
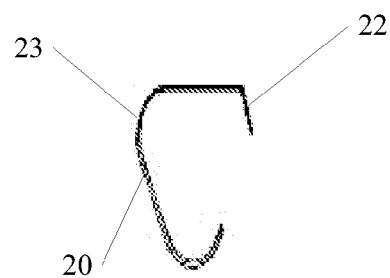
FIG. 7 is a structure schematic view of a fourth embodiment of an elastic piece of the present invention.
Figure 8:
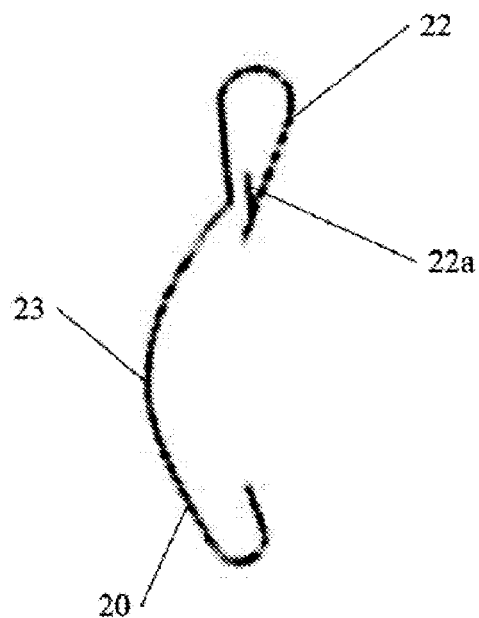
FIG. 8 is a structure schematic view of a fifth embodiment of an elastic piece of the present invention.
Figure 9:
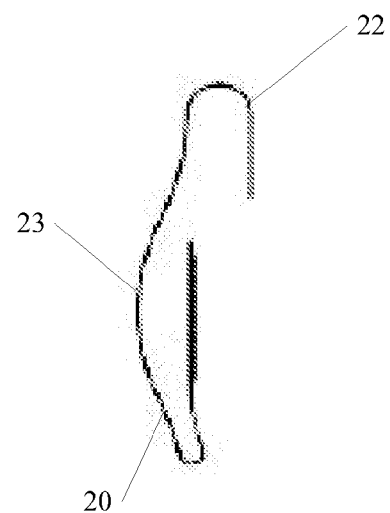
FIG. 9 is a structure schematic view of a sixth embodiment of an elastic piece of the present invention.

As shown in FIGS. 7 to 9, which are structure schematic views of several embodiments of the elastic piece 20. It should be pointed out that: the structure of the elastic piece 20 is not limited to the following several instances.

As shown in FIG. 7, the elastic piece 20 is approximate to a triangle, an edge of one end of which has a first bending edge 22, the elastic piece 20 employs the first bending edge 22 to be engaged with the mounting hole 11 of the back plate body 12 for being fixed on the back plate body 12. The elastic piece 20 has a second bending edge 23 on an edge of a second end opposite to the first end. The second bending edge 23 is used as the supporting portion for contacting with the grounding area of the circuit board.

As shown in FIG. 8, an edge of one end of the elastic piece 20 has a first bending edge 22. The first bending edge 22 is close toward the elastic piece 22 after being bent, and the first bending edge 22 also includes an inner extending portion 22a. The elastic piece 20 employs the first bending edge 22 to be engaged with the mounting hole 11 of the back plate body 12 for being fixed on the back plate body 12. The inner extending portion 22a increases the contacting area between the first bending edge 22 and the back plate body 12, to assist the elastic piece 20 to be better fixed on the back plate body 12 through the first bending edge 22. The elastic piece 20 has a second bending edge 23 on an edge of a second end opposite to the first end. The second bending edge 23 is used as the supporting portion for contacting with the grounding area of the circuit board 50.

As shown in FIG. 9, an edge of one end of the elastic piece 20 has a first bending edge 22. The first bending edge 22 is U-shaped. The elastic piece 20 employs the U-shaped first bending edge 22 to be engaged with the mounting hole 11 of the back plate body 12 for being fixed on the back plate body 12. The elastic piece 20 has a second bending edge 23 on an edge of a second end opposite to the first end. The second bending edge 23 is used as the supporting portion for contacting with the grounding area of the circuit board 50.

Figure 4:
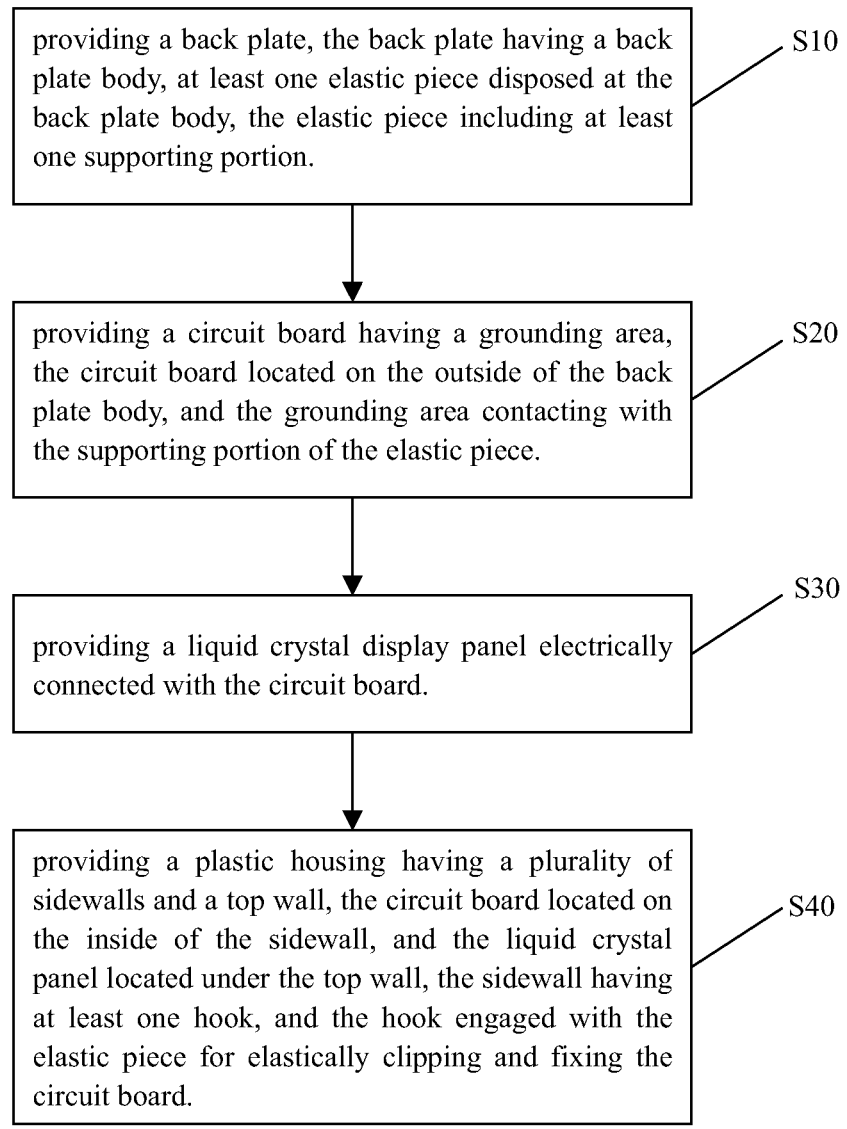
FIG. 4 is a flow chart of a method for fixing a circuit board of the LCD of FIG. 2.

Referring to FIG. 1 combined with FIG. 4, specifically, when fixing the circuit board 50 of the LCD 60, comprising the following steps of:

A step S10, providing a back plate 10, the back plate 10 having a back plate body 12, at least one elastic piece 20 is disposed at the back plate body 12, and the elastic piece 20 including at least one supporting portion 20a;

A step S20, providing a circuit board 50 having a grounding area, the circuit board 50 located on the outside of the back plate body 12, and the grounding area contacting with the supporting portion 20a of the elastic piece 20;

A step S30, providing an LCD panel 60 electrical connected to the circuit board 50; and A step S40, providing a plastic housing 30 having a plurality of sidewalls 30a and a top wall 30b, the circuit board 50 located on the inside of the sidewall 30a, the LCD panel 60 located under the top wall 30b, the sidewall 30a having at least one hook 40, the hook 40 being combined with the elastic piece 20 for elastically clipping and fixing the circuit board 50.

In this embodiment, the elastic piece 20 is arched-shaped. A bottom of the elastic piece 20 has bending edges 21. The back plate body 12 disposes mounting holes 11. The elastic piece 20 employs the engagement of the bending edges 21 and the mounting holes 11 to be fixed on the back plate body 12. The number of the bending edges 21 is four, being symmetrically disposed on four corners of a bottom of the elastic piece 20. The circuit board 50 forms a slot 51 in an edge thereof at a location corresponding to the hook 40.

Therefore, by the common function of the elastic piece 20 and the hook 40, the circuit board 50 is fixed, and can be grounded through the elastic piece 20 and the back plate body 12. The elastic piece 20 may also have many different embodiments, not being repeated herein.

The present invention has been illustrated by the above relative embodiments, but the above embodiments only are used as examples for implementing the present invention. It must be pointed out that the exposed embodiments cannot limit the scope of the present invention. Oppositely, the modification and equivalent structures included within the spirit and scope of the appended claims are also included within the scope of the present invention.

What is claimed is:

1. A liquid crystal display, characterized in that: the liquid crystal display comprises:
   a back plate having a back plate body, at least one elastic piece disposed at the back plate body, the elastic piece being an arched shape, an arched top of the arched shape being a supporting portion, two end edges of the arched shape having bending edges, the back plate body disposing mounting holes, and the elastic piece employing the engagement of the bending edge and the mounting hole to be fixed on the back plate body;
   a circuit board having a grounding area, the circuit board located on the outside of the back plate body, and the grounding area contacting with the supporting portion of the elastic piece;
   a liquid crystal display panel electrically connected with the circuit board; and
   a plastic housing having a plurality of sidewalls and a top wall, the circuit board located on the inside of the sidewall, the sidewall having at least one hook, the hook engaged with the elastic piece for elastically clipping and fixing the circuit board, the circuit board forming a slot at a location corresponding to the hook, and the hook being engaged with the slot, wherein the plastic housing and the hook are against a surface of the circuit board, and the surface where the circuit board contacting with the hook is opposite to the surface where the grounding area is located.

2. A liquid crystal display, characterized in that: the liquid crystal display comprises:
   a back plate having a back plate body, at least one elastic piece disposed at the back plate body, the elastic piece including at least one supporting portion;
   a circuit board having a grounding area, the circuit board located on the outside of the back plate body, and the grounding area contacting with the supporting portion of the elastic piece;
   a liquid crystal display panel electrically connected with the circuit board; and
   a plastic housing having a plurality of sidewalls and a top wall, the circuit board located on the inside of the sidewall, the sidewall having at least one hook, and the hook engaged with the elastic piece for elastically clipping and fixing the circuit board, wherein the plastic housing and the hook are against a surface of the circuit board, and the surface where the circuit board contacting with the hook is opposite to the surface where the grounding area is located.

3. The liquid crystal display according to claimed in claim 2, characterized in that: the elastic piece is an arched shape, an arched top of the arched shape is the supporting portion, two end edges of the arched shape have bending edges, the back plate body disposes mounting holes, and the elastic piece employs the engagement of the bending edge and the mounting hole to be fixed on the back plate body.

4. The liquid crystal display according to claimed in claim 3, characterized in that: the number of the bending edges is four, symmetrically formed on four corners of a bottom of the elastic piece.

5. The liquid crystal display according to claimed in claim 2, characterized in that: the elastic piece is locked and fixed on the back plate body through screws.

6. The liquid crystal display according to claimed in claim 2, characterized in that: the elastic piece is fixed on the back plate body through adhesive tapes.

7. The liquid crystal display according to claimed in claim 2, characterized in that: the circuit board forms a slot at a location corresponding to the hook, and the hook is engaged with the slot.

8. The liquid crystal display according to claimed in claim 2, characterized in that: an edge of a first end of the elastic piece has a first bending edge, the back plate body disposes a mounting hole, the elastic piece employs the first bending edge to be engaged with the mounting hole for being fixed on the back plate body, the elastic piece has a second bending edge on an edge of a second end opposite to the first end, and the second bending edge is used as the supporting portion.

9. The liquid crystal display according to claimed in claim 8, characterized in that: the first bending edge is U-shaped.

10. The liquid crystal display according to claimed in claim 8, characterized in that: the first bending edge is close toward the elastic piece after being bent, and the first bending edge also includes an inner extending portion.

11. A method for fixing a circuit board of a liquid crystal display, characterized in that: the method for fixing the circuit board comprises the following steps of:
   providing a back plate, the back plate having a back plate body, at least one elastic piece disposed at the back plate body, the elastic piece including at least one supporting portion;
   providing a circuit board having a grounding area, the circuit board located on the outside of the back plate body, and the grounding area contacting with the supporting portion of the elastic piece;
   providing a liquid crystal display panel electrically connected with the circuit board; and
   providing a plastic housing having a plurality of sidewalls and a top wall, the circuit board located on the inside of the sidewall, and the liquid crystal panel located under the top wall, the sidewall having at least one hook, and the hook engaged with the elastic piece for elastically clipping and fixing the circuit board, wherein the plastic housing and the hook are against a surface of the circuit board, and the surface where the circuit board contacting with the hook is opposite to the surface where the grounding area is located.

12. The method for fixing the circuit board of the liquid crystal display according to claimed in claim 11, characterized in that: the elastic piece is an arched shape, an arched top of the arched shape is the supporting portion, two end edges of the arched shape have bending edges, the back plate body disposes mounting holes, and the elastic piece employs the engagement of the bending edge and the mounting hole to be fixed on the back plate body.

13. The method for fixing the circuit board of the liquid crystal display according to claimed in claim 12, characterized in that: the number of the bending edges is four, being symmetrically formed on four corners of a bottom of the elastic piece.

14. The method for fixing the circuit board of the liquid crystal display according to claimed in claim 11, characterized in that: the elastic piece is locked and fixed on the back plate body through screws.

15. The method for fixing the circuit board of the liquid crystal display according to claimed in claim 11, characterized in that: the elastic piece is fixed on the back plate body through adhesive tapes.

16. The method for fixing the circuit board of the liquid crystal display according to claimed in claim 11, characterized in that: the circuit board forms a slot at a location corresponding to the hook, and the hook is engaged with the slot.

17. The method for fixing the circuit board of the liquid crystal display according to claimed in claim 11, characterized in that: an edge of a first end of the elastic piece has a first bending edge, the back plate body disposes a mounting hole, the elastic piece employs the first bending edge to be engaged with the mounting hole for being fixed on the back plate body, the elastic piece has a second bending edge on an edge of a second end opposite to the first end, and the second bending edge is used as the supporting portion.

18. The method for fixing the circuit board of the liquid crystal display according to claimed in claim 17, characterized in that: the first bending edge is U-shaped.

19. The method for fixing the circuit board of the liquid crystal display according to claimed in claim 17, characterized in that: the first bending edge is close toward the elastic piece after being bent, and the first bending edge also includes an inner extending portion.

* * * * *